Oct. 20, 1959 F. P. EMERY ET AL 2,909,779
MAGNETIC AMPLIFIER CONTROLLED ELECTRIC
GOVERNOR FOR PRIME MOVERS
Original Filed Sept. 20, 1955 4 Sheets-Sheet 1
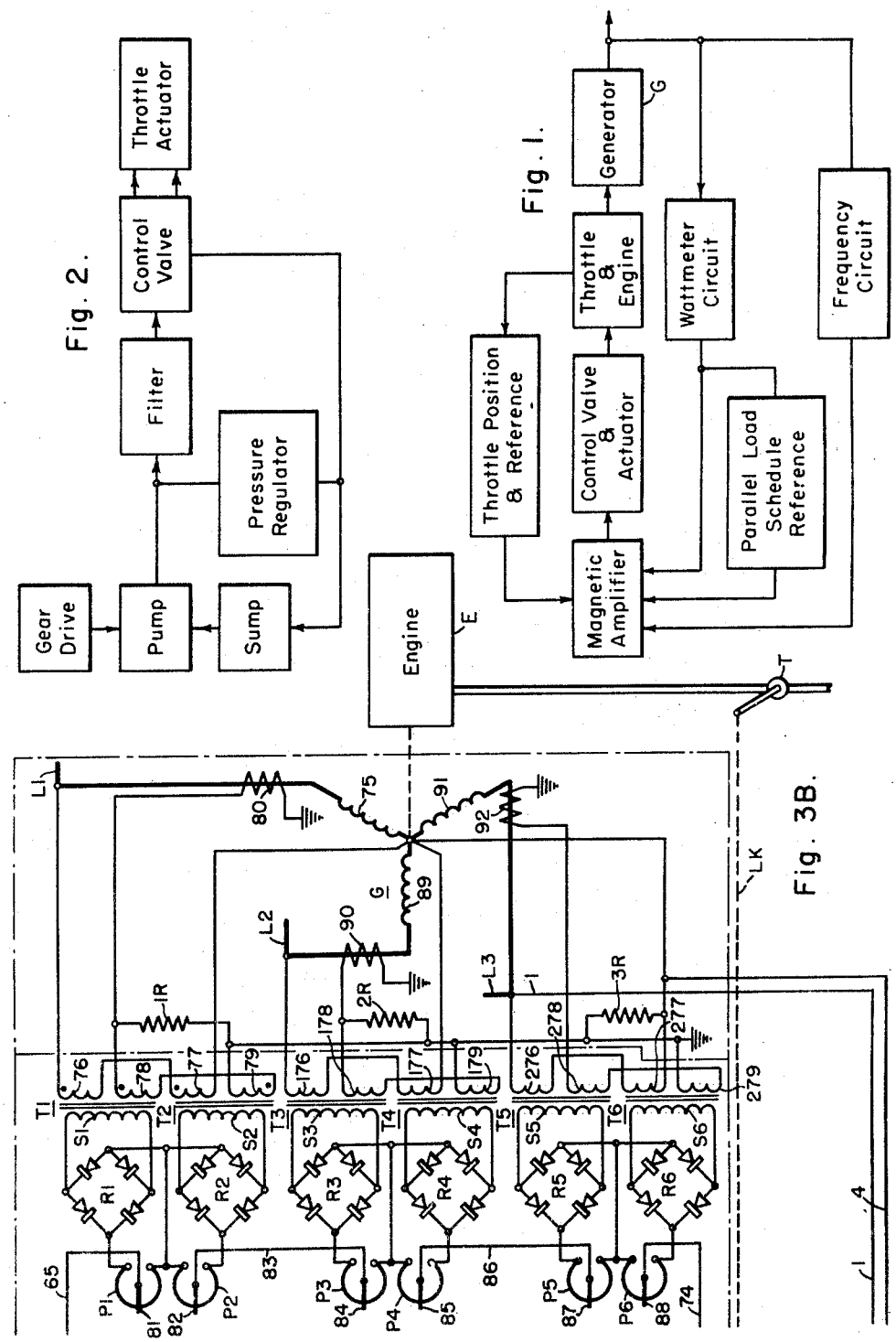

United States Patent Office 2,909,779
Patented Oct. 20, 1959

2,909,779

MAGNETIC AMPLIFIER CONTROLLED ELECTRIC GOVERNOR FOR PRIME MOVERS

Frederic P. Emery, Buffalo, N.Y., and Harley A. Perkins, Jr., Pittsburgh, Pa., assignors to Westinghouse Electric Corporation, East Pittsburgh, Pa., a corporation of Pennsylvania Continuation of application Serial No. 535,455, September 20, 1955. This application August 16, 1957, Serial No. 678,574

7 Claims. (Cl. 290—4)

This invention relates to electric systems of control and more particularly to systems of control, including magnetic amplifiers, for governing the operation of a prime mover, or prime movers, coupled to drive electric generators, or sets of generators, as for example alternators, and is a continuation of the application filed by the same applicants, Serial No. 535,455, now abandoned, filed September 20, 1955, and entitled Single Stage Magnetic Amplifier Controlled Electric Governor for Generator Sets Driven by Prime Movers.

The trend in recent years to expect higher and higher performance from electric generating equipment has reached the point of necessitating higher performance from the prime movers driving the generating equipment. These higher performance requirements are essential needs and include, closer steady-state control of electric frequency of, say, an alternator driven by a prime mover, more reliable and effective load sharing among two or more generating units coupled to prime movers, and, especially, very rapid recovery from transient conditions.

One broad object of this invention is the provision of accurate and reliable electric governing control means for the prime mover driving electric generating means.

Another broad object of this invention is the provision of means to hold a close steady-state control of the frequency of an alternator coupled to a prime mover.

Another object of this invention is the provision of means to enable the prime mover driving an alternator to anticipate a change in frequency due to a change in load and to readjust the throttle position of the prime mover before there is a frequency change.

It is also an object of this invention to provide for no frequency drop in a system including any number of alternators connected in parallel by suitable controls of the prime movers driving the alternators.

It is also a broad object of this invention to provide for the division of the total load on a plurality of alternators connected in parallel in accordance with the individual ratings of the alternators.

It is also an object of this invention to accomplish the desired functions without the use of tubes or other fragile components but with the use of components which will withstand shock and vibration with no damage to its components.

The objects recited are merely illustrative. Other objects and advantages will become more apparent from a study of the following specification and the accompanying drawings, in which:

Fig. 1 is a schematic showing, in block form, of the electrical elements of this invention;

Fig. 2 is a schematic showing, in block form, of the hydraulic apparatus used with this invention;

Figure 3A:
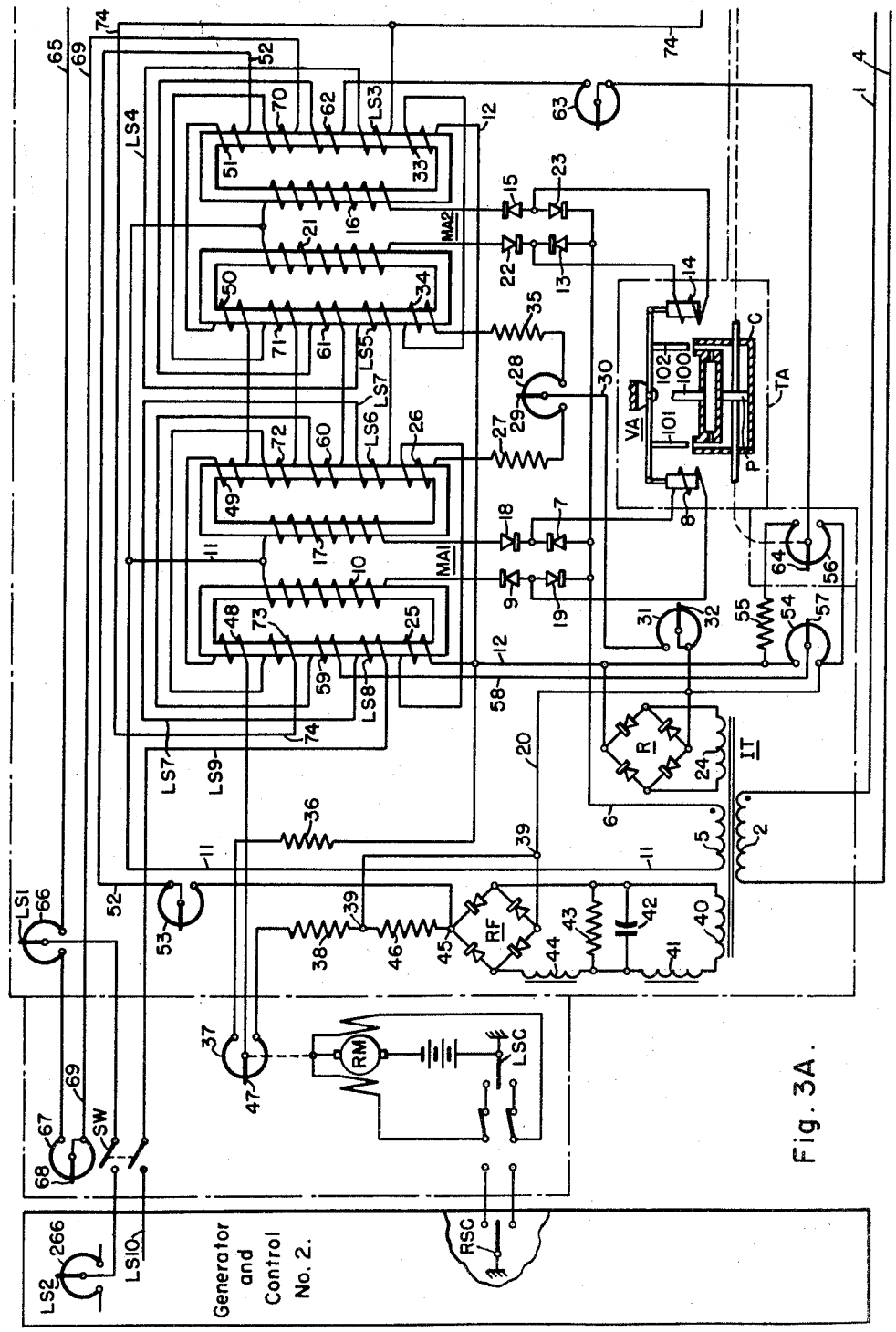
Figure 4:
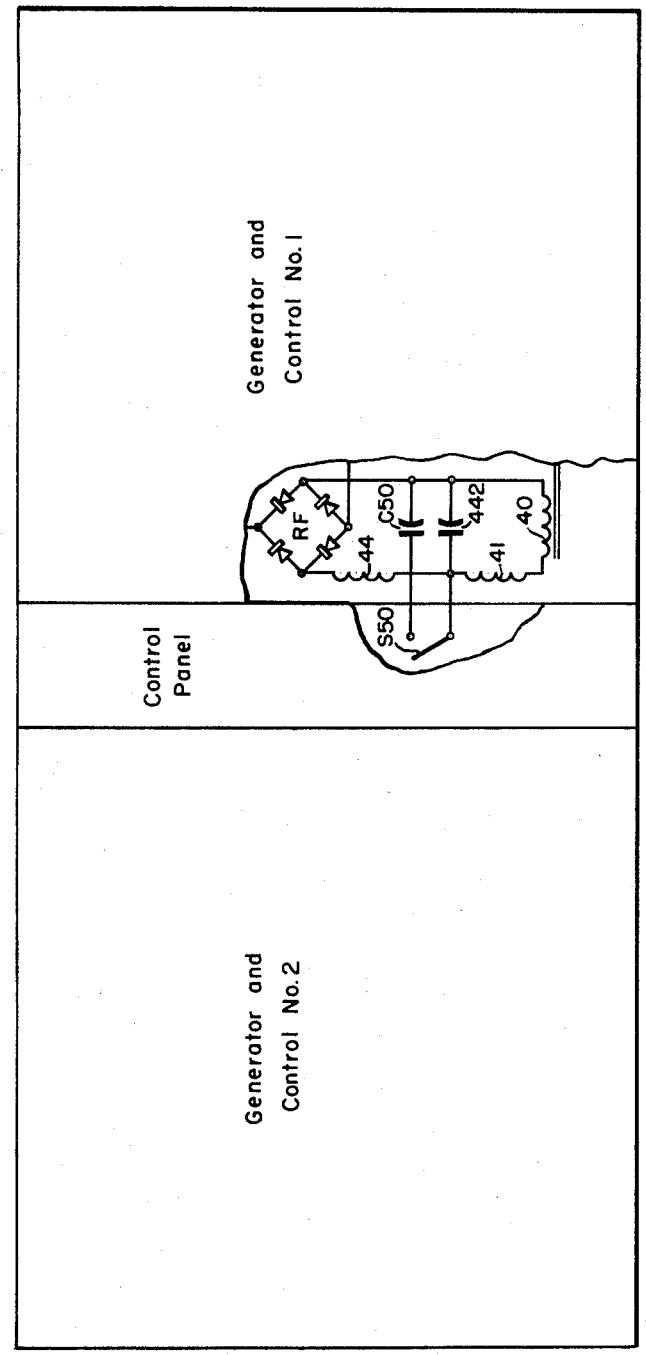
Figure 5:
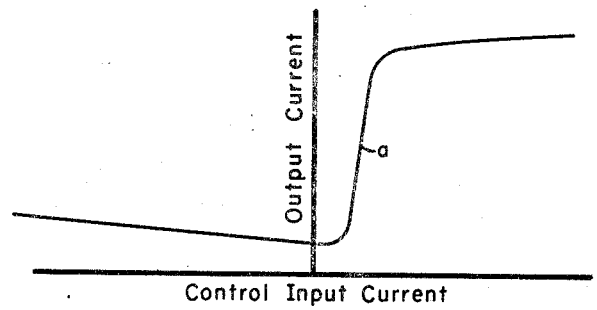
Figure 6:
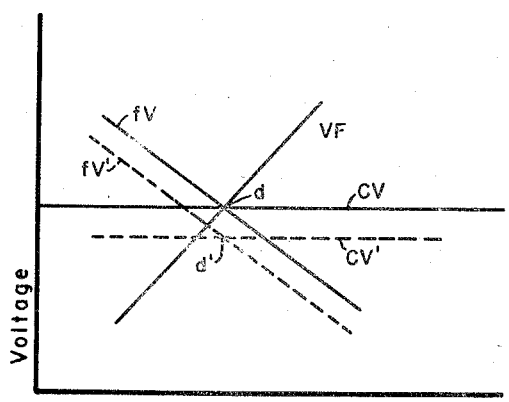
Figure 7:
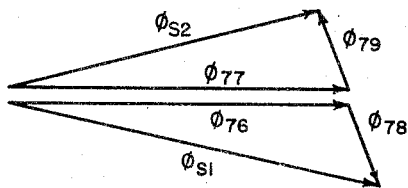
Figure 8:
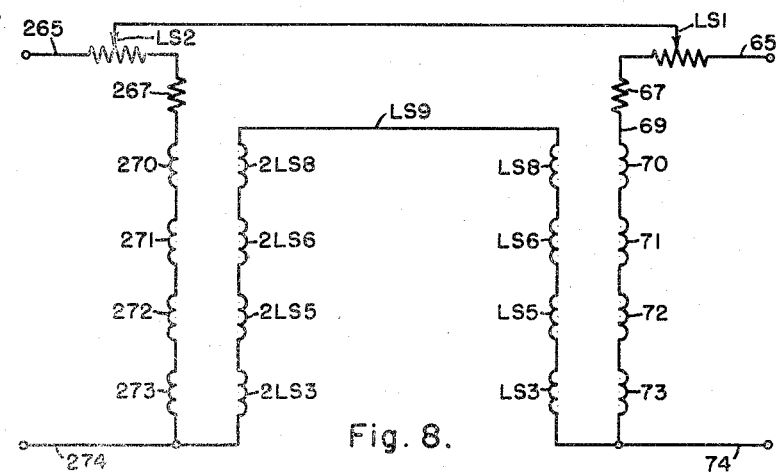

Figs. 3A and 3B together are a diagrammatic showing of the electric apparatus and the prime mover to be controlled;

Fig. 4 is a showing, largely in block form, of a modification of showings of Figs. 3A and 3B;

Fig. 5 shows the operating characteristic of the magnetic amplifiers used;

Fig. 6 shows some curves of value in understating the frequency control of this invention;

Fig. 7 shows vector diagrams illustrating the function of the load responsive feature of the control included in this invention; and Fig. 8 is a simplified showing of the circuitry for effecting proper load sharing of alternators connected in parallel.

To gain a broad understanding of this invention, a brief preliminary discussion of Figs. 1 and 2 may be helpful.

The block designated generator represents an alternator G mechanically coupled to the engine included in the block designated throttle and engine. The alternator G is electrically connected to a load, not shown.

The throttle of the engine is actuated hydraulically by the control valve and actuator, which is in turn controlled electromagnetically by the output of the magnetic amplifier.

To provide for proper control of the engine throttle the magnetic amplifier is controlled as a function of the alternator frequency through the frequency circuit. To prevent hunting, and to otherwise improve operation, the magnetic amplifier is controlled by means of a negative feedback providing a throttle position reference.

If only a frequency response and a throttle position reference are used, the alternator will manifest a droop with load changes. A compensation as a function of generator power output is thus also provided for the magnetic amplifier by the wattmeter circuit.

When two alternators are operated in parallel a parallel load schedule reference is also provided to obtain effective balanced operation of the two alternators.

To provide the hydraulic control a suitable pump, coupled to the engine through a suitable gear drive, pumps liquid through the filter to the control valve which effects operation of the throttle actuator. To provide for a proper constant liquid pressure in the system a pressure regulator bleeds off the proper amount of liquid from the control valve to the sump.

To understand some of the details of this invention reference may be had to Figs. 3A and 3B.

The engine E is shown coupled to drive the alternator G which alternator is in use connected to supply power to leads L1, L2 and L3 and to the control apparatus.

The engine is controlled by the throttle T, which is actuated by link LK from the throttle actuator TA. The throttle actuator includes a piston P in the cylinder C. Liquid under a suitable constant pressure enters conduit 100 and thus provides a liquid pressure at both sides of the piston P through the system of conduits shown.

Whether or not the pressure is the same on both sides of the piston P depends on the positions of the valves 101 and 102 with respect to the discharge openings adjacent the bottom ends of the valves. The valves are actuated by push-pull electromagnets having the actuating coils 8 and 14. These coils 8 and 14 are in the output circuits of the magnetic amplifiers MA1 and MA2, respectively. The input to the main windings 10, 16, 17, and 21 of the magnetic amplifiers is provided from the alternator G.

The energizing circuits for the main windings may be traced from lead L3, through conductor 1, primary winding 2 of the isolation transformer IT, and conductor 4 to the neutral, or ground, of the generator.

The isolation transformer has the secondary windings 5, 24 and 40. The secondary winding 5 supplies the energization of the main windings of the magnetic amplifiers.

When terminal 6 is positive, an energizing circuit is established from this terminal 6 through rectifier 7, actuating coil 8 of the valve actuator VA, rectifier 9, main winding 10 of the magnetic amplifier MA1 to terminal 11 of the secondary 5. During this same half cycle, a second energized circuit is established from terminal 6 through rectifier 13, actuating coil 14 of the valve actuator VA, rectifier 15, main winding 16 of the magnetic amplifier MA2 to terminal 11.

For the second half cycle, when terminal 11 is positive, an energizing circuit is established from this terminal 11 through main winding 17 of magnetic amplifier MA1, rectifier 18, actuating coil 8 and rectifier 19 to terminal 6. During this same second half cycle a circuit is also established from terminal 11 through main winding 21, rectifier 22, actuating coil 14, rectifier 23 to terminal 6.

From the circuitry just traced, it is apparent that coils 8 and 14 are energized with full-wave rectified direct current, and from the direction of the current through the coils 8 and 14 and their winding direction, it is further apparent that the actions of the coils 8 and 14 on the valve actuator VA are in opposition to each other. The positions of the valves 101 and 102 are thus a function of the difference of the energization of coils 8 and 14.

Since the magnetic amplifiers here used are of the self-saturating type, the true effective function of coils 8 and 14 is thus determined by the total effect of all the control windings on the magnetic amplifiers. The preferred point of operation of each magnetic amplifier used in this control is preferably at, or near, the midpoint of the straight portion of the operating characteristic, as point $a$ of the operating characteristic shown in Fig. 5. Further, the design and selection of the amplifiers is such that their operating characteristics are substantially the same. Further, the straight portion of the characteristic is preferably quite steep but not actually vertical.

To cause each magnetic amplifier to operate at or ner the midpoint of its characteristic, the magnetic amplifiers are provided with bias windings.

The secondary winding 24 of the isolation transformer is connected to the alternating-current terminals of the full-wave rectifier R. The output of the rectifier R supplies a direct current voltage to leads 12 and 20, and this voltage is a constant voltage, except for abnormal alternator operation.

To energize the bias windings a circuit is established from the positive conductor 12, through bias windings 25 and 26 of the magnetic amplifier MA1, resistor 27, bias balance potentiometer 28, adjustable tap 29, conductor 30, bias level adjusting potentiometer 31, adjustable tap 32 to the negative terminal 20.

Another energizing circuit is also established from the positive conductor 12 through biasing windings 33 and 34 of the magnetic amplifier MA2, resistor 35, the bias balance potentiometer to adjustable tap 29. Since the adjustable potentiometer 31 is in the circuit of all the biasing windings, this potentiometer can be used to adjust the "up-and-down" position on the magnetic characteristic of both magnetic amplifiers. Since the relative amount of resistance of the potentiometer 28 in the respective circuits of bias windings 25 and 26, and 33 and 34 is adjustable, it is apparent that clockwise movement of tap 29 increases the excitation of bias windings 33 and 34 and at the same time decreases the excitation of bias windings 25 and 26. Of course, the reverse effect is caused by counterclockwise operation of tap 29.

From the discussion of the circuitry and control of the bias windings it is apparent that the operations of the magnetic amplifiers may be adjusted to any level on the operating characteristic and that balanced operation may be obtained at the levels selected.

The output terminals of rectifier R are also connected to energize a potentiometer circuit. This circuit may be traced from the positive conductor 12 through resistor 36, frequency reference potentiometer 37, and resistor 38 to junction 39 connected to the negative conductor 20. The utility of this potentiometer circuit will become apparent as the description proceeds.

The isolation transformer is also provided with secondary winding 40. This secondary winding 40 is connected in a loop circuit with a reactor 41, having a selected reactance value, and a capacitor 42, having a selected capacitance value. A resistor 43, having a selected resistance value, is connected in parallel with the capacitor 42, and a second reactor 44, having a selected reactance value, and a full-wave rectifier RF, connected, through its alternating-current input terminals, in series with the reactor 44, are also connected in parallel to the capacitor 42.

The direct-current output terminals of full-wave rectifier RF are connected to junctions 39 and 45 with the positive terminal being connected to junction 45 and the negative terminal being connected to junction 39. The operating characteristics of the elements RF, 40, 41, 42, 43 and 44 are so selected that the direct current voltage impressed across resistor 46 is substantially inversely proportional to frequency over a given relatively narrow range but which range includes the desired operating frequency of the alternator, G. Curve $fV$ in Fig. 6 represents this voltage. A rise of frequency from a selected value causes a decrease in voltage across resistor 46 and a decrease in frequency from a selected value causes a rise in voltage across resistor 46.

From explanations made hereinbefore, it is apparent that the voltage drop through resistors 36, 37 and 38 is from positive to negative at junction 39. This means that tap 47 on potentiometer 37 is positive with respect to junction 39. Since junction 45 is positive with respect to junction 39, it is apparent that when the output voltage of rectifier R is constant which for all normal operation of the alternator is constant, and the frequency and voltage output of secondary 40 is constant, that tap 47 may be shifted to such a point on resistor 37 that tap 47 has the same positive voltage value as junction 45. Shifting tap 47 merely means that curve CV is shifted up or down as required. If the alternator frequency is at the desired value, say 60 cycles, and the alternator voltage is at the desired constant value, then the voltage value across junctions 45 and 39 will be, for example, at $d$ on curve $fV$. By shifting tap 47, the curve CV is shifted until it includes point $d$.

In practice, this accomplished by the reversing motor RM and suitable operation of the local switch LSC or the remote switch RSC in such a direction until the voltage across tap 47 and junction 45 is zero. Thereafter, any departure of the frequency from the desired frequency will shift the direct current voltage across junction 45 and tap 47 along curve $fV$. If the frequency increases, junctions will have a lower voltage than tap 47 and when the frequency decreases, tap 47 will have a lower voltage than tap 45. The magnitude of the direct current voltage across tap 47 and junction 45 will be a measure of the magnitude of the departure of the frequency from a desired frequency and the sense, or effective polarity of the voltage, will be a function of the direction of the departure of the frequency from a desired frequency.

Resistor 43 is used because the non-linear properties of inductor 41 permit the establishment of a ferro-resonant circuit between inductor 41 and capacitor 42. By lowering the effective Q of the circuit, resistor 43 maintains the voltage-frequency characteristic $fV$ even in the presence of moderate overvoltage from generator G.

To make the functions of the magnetic amplifiers reflect any change in frequency, an energizing circuit is established from tap 47 through control windings 48 and 49 of magnetic amplifier MA1, and control windings 50 and 51 of magnetic amplifier MA2, conductor 52, and frequency gain adjusting resistor 53 to junction 45.

Changes in alternator voltage have but a small effect, but if there is such a change the outputs of the secondary windings 24 and 40 are affected substantially alike. The output from secondary 24 during a decrease in voltage will shift curve CV to position CV', but the output of secondary 40 will shift curve fV to fV'. The difference voltage is still zero since point d' is still at the same frequency value represented by point d.

A governor control that takes into account frequency changes only may have an excessive drooping frequency vs. load characteristic and may hunt, or manifest other minor instabilities, or both. To eliminate such not quite perfect operation, a throttle position feedback control is provided for the magnetic amplifiers.

To accomplish this control a no-load throttle position adjusting potentiometer 54 is connected across leads 12 and 20 and a fixed resistor 55 in series with a throttle position indicating potentiometer 56 are also connected across leads 12 and 20.

The feedback control in then effected by the circuit from tap 57 on potentiometer 54 through conductor 58, control windings 59 and 60 of magnetic amplifier MA1, control windings 61 and 62 of magnetic amplifier MA2, position gain adjusting resistor 63 to tap 64 on potentiometer 56.

Any movement of the throttle from the desired position unbalances the voltage across taps 57 and 64 and causes a current to flow in the control windings in this feedback circuit in such a direction to provide a negative feedback. In other words, when tap 47 is more positive than junction 45, then tap 64 is more positive than tap 57, and when junction 45 is more positive than tap 47, then tap 57 is more positive than tap 64.

Frequency control and throttle position control do not take into account the effect on speed of load variations on the alternator. In fact, in the absence of some load compensation control the speed characteristic will have a droop.

Load sensing anticipates frequency change. With a proper load sensing circuit and control, the control of the frequency is made extremely close under conditions of changing load or other transient disturbances. Without first describing the accurate load sensing circuitry and its cooperation with the magnetic amplifiers it will, for the moment, suffice, to know that the load intelligence voltage appears across leads 65 and 74, with lead 65 being positive and lead 74 being negative.

With leads 65 and 74 energized as mentioned, an energized circuit is established from positive lead 65 through all of the resistor sections of the load sharing potentiometer 66, a selected number of resistor sections of the frequency regulating potentiometer 67, tap 68, conductor 69, control windings 70 and 71 of magnetic amplifier MA2, control windings 72 and 73 of the magnetic amplifier MA1 to the negative lead 74.

By means of potentiometer 67 the magnitude of the load compensation may be adjusted and the magnitude can thus at will be adjusted to change the normally drooping speed characteristic to a substantially flat, or even rising speed characteristic.

The utility of potentiometer 66 will become apparent as the description proceeds.

The elements of the circuitry shown in Fig. 3B including the potentiometers $P_1$, $P_2$, $P_3$, $P_4$, $P_5$, and $P_6$, rectifiers $R_1$, $R_2$, $R_3$, $R_4$, $R_5$, and $R_6$, and the transformers $T_1$, $T_2$, $T_3$, $T_4$, $T_5$, and $T_6$ and the supply circuitry for these elements comprise a device, broadly stated, for obtaining the product of a magnitude of a quantity represented by an A.C. voltage and the cosine of its phase angle with respect to a reference A.C. voltage of the same frequency. Such a device has many uses and possible applications, but in the arrangement herein shown and described the device is useful for obtaining an electrical control signal across leads 65 and 74 proportional to $I \cos \theta$, and is thus used as the intelligence for the electric load control provided in this combination. In the term $I \cos \theta$, I represents the load current of the alternator and $\theta$ the power factor angle. The control intelligence is thus a direct function of the total useful power output of the alternator.

Each transformer of this group has a simple loop magnetic circuit. To understand the function of this portion of the control it suffices to describe the function of transformers T1 and T2.

These two transformers T1 and T2 have primary windings 76 and 77, respectively, and primary windings 78 and 79, respectively. The primary windings 76 and 77 are connected in a loop circuit with phase winding 75 and are wound with relatively large number of turns on the transformer cores in the same sense.

The phase winding 75 has a current transformer 80 connected in a loop circuit with the resistor IR having a relatively low resistance value. The primary windings 78 and 79 are connected across this resistor IR with the primary 78 being wound in one sense with respect to the transformer core and the primary winding 79 wound in an opposite sense. The voltage drop across resistor IR being rather low and the number of turns for the primary windings 78 and 79 being considerably lower than the number of turns on primary windings 76 and 77, the output of secondary windings together is a function of the load current times the power factor.

The voltage supplied by windings 76 and 77 of equal turns and acting additively is the reference voltage. The load intelligence is applied to the coils, or windings, 78 and 79 of equal turns and acting subtractively. The vector diagram, see Fig. 7, of the function of this circuitry shows that the flux $\phi_{S1}$, as far as secondary S1 is concerned, is the vector sum of the fluxes $\phi_{76}$ and $\phi_{78}$ produced by the ampere turns of windings 76 and 78. Similarly, the vector diagram also shows that the flux $\phi_{S2}$, so far as secondary S2 is concerned, is the vector sum of the fluxes $\phi_{77}$ and $\phi_{79}$ produced by windings 77 and 79. The voltages induced in the secondary windings S1 and S2 are rectified by the rectifiers R1 and R2 to produce two direct current voltages. When the ampere turns of windings 76 and 77 are chosen to be large with respect to the ampere turns of windings 78 and 79, the difference voltage of the two direct current voltages becomes closely proportional to the $I \cos \theta$, where I represents the load current in phase 75 and $\cos \theta$ the power factor.

Each of the phase windings 89 and 91 is provided with a control output circuit like the phase winding 75. For phase windings 89 this control output circuit is represented by elements 90, 2R, 176, 177, 178, 179, S3, S4, R3, R4, P3, and P4. For phase windings 91 this control output circuit is represented by elements 92, 3R, 276, 277, 278, 279, S5, S6, R5, R6, P5 and P6.

Since the outputs of the phase windings 75, 89 and 91 are not balanced, nor can the associated circuitry be so chosen to be perfectly balanced, the control output circuits are provided with the balancing potentiometers P1, P2, P3, P4, P5 and P6. When these potentiometers are properly adjusted, then the output at leads 65 and 74 from the circuit through taps 81 and 82, conductor 83, taps 84 and 85, conductor 86, taps 87 and 88 to conductor 74 is proportional to the total effective power output of the alternator, i.e., is proportional to the sum of the products of armature currents and power factors of the respective phases.

The foregoing description is mostly directed to a governor control for a prime mover driving one alternator. In actual practice two or more alternators, sometimes not of equal capacity, are connected to supply a common load and are driven by separate prime movers. When this is the case provision must be made in the control of each governor to effect proper load sharing.

The control of each prime mover and its alternator is identical to the one hereinabove disclosed. This is indicated at the left of Fig. 3A by the block designated generator and control #2.

Each control is provided with a potentiometer as 66. For the second alternator this is designated as potentiometer 266 also in the output circuit corresponding to leads 65 and 74.

When a second alternator is being used and load balancing is to be effected the switch SW is closed. If there is perfect balance of the loads of the two alternators, taps LS1 and LS2 with respect to conductors 74 and 274 are at the same potential, but if there is a load unbalance a difference of potential exists between taps and the polarity depends on the alternator which tends to take the greater load.

If alternator #2 takes the greater load, tap LS2 will be more positive with respect to lead 274 then tap LS1 is with respect to lead 74. The result is that a control current flows from tap LS2 through the top portion of switch SW, tap LS1, portions of potentiometers 66 and 67, conductor 69, control windings 70 and 71 of magnetic amplifier MA2, control windings 72 and 73 of magnetic amplifier MA1, conductor 74, control windings LS3 and LS5 of magnetic amplifier MA2, control windings LS6 and LS8 of magnetic amplifier MA1, conductor LS9, the lower portion of switch SW, control windings 2LS8, 2LS6, 2LS5, and 2LS3 for the magnetic amplifiers of the second generator, conductor 274, the $I \cos \theta$ output control circuitry of the second generator to conductor 265 to tap LS2.

When the polarity is reversed so that tap LS1 is more positive with respect to 74 than LS2 is with respect to 274, the current in the control windings LS3, LS5, LS6, LS8, 2LS8, 2LS6, 2LS5, and 2LS3 is reversed. In the first case the load on generator G is increased and that of 2G is decreased and in the second case the operation is opposite.

By suitable adjustment of the taps LS1 and LS2 on the potentiometers 66 and 266 the load sharing may be adjusted in accordance with the capacity of the alternators. The control is thus not limited to prime-mover generator-sets of equal capacity. This load sharing circuit thus produces an electrical output proportional to percentage load unbalance between parallel generators.

From the foregoing it will be noted that all the electrical control signals are added and amplified by the magnetic amplifiers to give an electrical signal that will enable the remaining circuitry to maintain constant generator frequency.

The magnetic amplifier operates the electrohydraulic valve which amplifies the electrical signal and operates the double ended hydraulic piston P which positions the prime mover throttle.

To briefly summarize some of the advantages of this invention it is to be noted that the control:

(a) Enables the prime mover to hold close steady-state control of frequency;

(b) Enables the prime mover to anticipate a change in frequency due to a change in load and to correct the throttle setting before there is an actual change in frequency;

(c) Enables any number of engine-generator sets to be paralleled with no frequency droop, and the total load may be divided among the units in proportion to the set ratings of the units; and (d) The invention does not use vacuum tubes or other fragile components, but uses only components that will withstand shock and vibration without change in operation.

The description made is for apparatus particularly designed for 60 cycle operation. If any other frequency of operation is contemplated, merely the frequency responsive control need be changed.

Fig. 4 illustrates this change. The secondary winding 40 is still connected in a loop circuit with the reactors 41 and 42 and rectifier RF. The capacity of capacitor 442 is different than the capacity of capacitor 42 and a switch S50 is provided to connect the capacitor C50 in parallel with capacitor 442. When the switch S50 is open the control is arranged for 60 cycle operation. With switch S50 closed the control is arranged for 50 cycle operation.

While but two embodiments of the invention have been disclosed, it is to be understood that the invention is capable of various adaptations, for example to controls which permit the governor to maintain alternators at any practical frequency, and that still other changes and modifications may be made which all fall within the spirit of the invention. The subject matter claimed is presented in the following claims.

We claim as our invention:

1. In an electric system of control for maintaining the frequency of the alternating current output of an alternator coupled to a prime mover constant, in combination, a throttle for the prime mover, which throttle in use is operable to change the speed of the prime mover with reference to a selected constant speed, electro-mechanical means for effecting the operation of the throttle, magnetic amplifier means for energizing the electro-mechanical means, control means, operable as a function of the frequency of the alternating current output of said alternator, for controlling the operation of the magnetic amplifier means, second control means responsive to throttle position with reference to a selected position for providing a negative control effect on said magnetic amplifier means, third control means responsive to the useful power output of the alternator for providing a positive control effect on said magnetic amplifier means, a second electric system of control and apparatus to be controlled as hereinbefore recited, and further control means responsive to the difference of the useful power outputs of the two alternators thus involved for controlling the relative effects of the two magnetic amplifier means involved to balance the loads on the two alternators.

2. In an electric system of control for maintaining the frequency of the alternating current output of an alternator coupled to a prime mover at a predetermined frequency, in combination, a throttle for the prime mover, which throttle in use is operable to change the speed of the prime mover, electro-mechanical means for effecting the operation of the throttle to change the prime mover speed, magnetic amplifier means for energizing the electro-mechanical means, control means for providing a reference signal as a function of the frequency variation of the alternating current output of said alternator from said predetermined frequency for controlling the operation of the magnetic amplifier means, further control means responsive to the useful power output of the alternator for providing a further control effect on said magnetic amplifier means, a second electric system of control and apparatus to be controlled as hereinbefore recited, and still further control means responsive to the difference of the useful power outputs of the two alternators thus involved for controlling the relative effects of the two magnetic amplifier means involved to balance the loads of the two alternators.

3. In electric control apparatus for controlling the operation of a prime mover, said control apparatus including an alternating current generator coupled to the prime mover, isolation transformer means connected to the generator, first rectifying means, connected to the transformer means, for producing a constant voltage direct current ouput, LC circuitry including second rectifying means, also connected to the transformer means, for producing a direct current output highly sensitive to the minutest change in frequency of the generator, the combination of a control member for said prime mover, electromagnetic means for controlling the position of said control member to thereby control the operation of said prime mover in accordance with the energization of said electromagnetic means, electrical amplifier means having its output connected to energize said electromagnetic means, control means connected to said first and second rectifying means for controlling said electrical amplifier means as a function of the voltage difference between said first rectifying means and said second rectifying means to thus effect energization of said electromagnetic means in accordance with said voltage difference.

4. In electric control apparatus for controlling the operation of a prime mover, said control apparatus including an alternating current generator coupled to the prime mover, isolation transformer means connected to the generator, first rectifying means, connected to the transformer means, for producing a constant voltage direct current ouput, LC circuitry including second rectifying means, also connected to the transformer means, for producing a direct current output highly sensitive to the minutest change in frequency of the generator, the combination of a control member for said prime mover, electromagnetic means for controlling the position of said control member to thereby control the operation of said prime mover in accordance with the energization of said electromagnetic means, electrical amplifier means having its output connected to energize said electromagnetic means, control means connected to said first and second rectifying means for controlling said electrical amplifier means as a function of the voltage difference between said first rectifying means and said second rectifying means to thus effect energization of said electromagnetic means in accordance with said voltage difference, a second prime mover, and control apparatus like the control apparatus hereinafter recited, and means responsive to an unbalance in the load on the generators in the two control apparatus for oppositely controlling the two electric amplifier means to effect a balanced loading of the generators.

5. In electric control apparatus for controlling the operation of a prime mover, said control apparatus including an alternating current generator coupled to the prime mover, isolation transformer means connected to the generator, first rectifying means, connected to the transformer means, for producing a constant voltage direct current ouput, LC circuitry including second rectifying means, also connected to the transformer means, for producing a direct current output highly sensitive to the minutest change in frequency of the generator, the combination of a control member for said prime mover, electromagnetic means for controlling the position of said control member to thereby control the operation of said prime mover in accordance with the energization of said electromagnetic means, electrical amplifier means having its output connected to energize said electromagnetic means, control means connected to said first and second rectifying means for controlling said electrical amplifier means as a function of the voltage difference between said first rectifying means and said second rectifying means to thus effect energization of said electromagnetic means in accordance with said voltage difference, and second control means responsive to the position of said control member with reference to a predetermined control position for providing a negative control effect on said electrical amplifier means.

6. In electric control apparatus for controlling the operation of a prime mover, said control apparatus including an alternating current generator coupled to the prime mover, isolation transformer means connected to the generator, first rectifying means, connected to the transformer means, for producing a constant voltage direct current ouput, LC circuitry including second rectifying means, also connected to the transformer means, for producing a direct current output highly sensitive to the minutest change in frequency of the generator, the combination of a control member for said prime mover, electromagnetic means for controlling the position of said control member to thereby control the operation of said prime mover in accordance with the energization of said electromagnetic means, electrical amplifier means having its output connected to energize said electromagnetic means, control means connected to said first and second rectifying means for controlling said electrical amplifier means as a function of the voltage difference between said first rectifying means and said second rectifying means to thus effect energization of said electromagnetic means in accordance with said voltage difference, and second control means responsive to the position of said control member with reference to a predetermined control position for providing a negative control effect on said electrical amplifier means, a second prime mover, and control apparatus like the control apparatus hereinabove recited, and means responsive to an unbalance in the load on the generators in the two control apparatus for oppositely controlling the two electric amplifier means to effect a balanced loading of the generators.

7. In an electric system of control for maintaining the frequency of the alternating current output of an alternator coupled to a prime mover at a selected frequency, in combination, a throttle for the prime mover which throttle in use is operable to control the speed of the prime mover, electromechanical means for effecting the operation of the throttle, magnetic amplifier means for energizing the electromechanical means, control means operable as a function of a frequency difference between the output of the alternator coupled to the prime mover and said selected frequency for controlling the operation of the magnetic amplifier means, a second alternator coupled to a second prime mover, a second throttle for the second prime mover, second electromechanical means for operating the second throttle, second magnetic amplifier means functioning, with reference to the second alternator, prime mover and throttle, like the first magnetic amplifier means to effect the operation of the second alernator to have an output frequency like the first alternator, and means responsive to the effective power outputs of the respective alternators to effect loading of the alternators in proportion to their ratings.

References Cited in the file of this patent

UNITED STATES PATENTS

| | | |
|---|---|---|
| 2,558,729 | Buechler | July 3, 1951 |
| 2,754,468 | Grillo | July 10, 1956 |
| 2,780,733 | Chyba | Feb. 5, 1957 |